United States Patent
Semrad et al.

(10) Patent No.: US 7,898,956 B2
(45) Date of Patent: Mar. 1, 2011

(54) CREDIT-BASED RATE CONTROL FOR HIGH-SPEED INTERFACES

(75) Inventors: Daniel Semrad, Ottawa (CA); Steve Driediger, Kanata (CA)

(73) Assignee: Alcatel Lucent, Paris (FR)

( * ) Notice: Subject to any disclaimer, the term of this patent is extended or adjusted under 35 U.S.C. 154(b) by 1198 days.

(21) Appl. No.: 11/519,559

(22) Filed: Sep. 12, 2006

(65) Prior Publication Data

US 2008/0062873 A1     Mar. 13, 2008

(51) Int. Cl.
*G06F 11/00* (2006.01)
(52) U.S. Cl. .................................. 370/235; 370/230.1
(58) Field of Classification Search .......... 370/229–240
See application file for complete search history.

(56) References Cited

U.S. PATENT DOCUMENTS

| | | | |
|---|---|---|---|
| 6,259,693 B1 * | 7/2001 | Ganmukhi et al. .......... 370/366 |
| 6,757,249 B1 * | 6/2004 | Kejriwal et al. .......... 370/235.1 |
| 6,882,623 B1 * | 4/2005 | Goren et al. ................ 370/230 |
| 7,310,309 B1 * | 12/2007 | Xu ........................... 370/230.1 |
| 7,596,090 B2 * | 9/2009 | Black ......................... 370/234 |
| 2003/0117958 A1 | 6/2003 | Nation et al. |
| 2004/0062259 A1 * | 4/2004 | Jeffries et al. ............... 370/412 |
| 2004/0090994 A1 * | 5/2004 | Lockridge et al. .......... 370/509 |

* cited by examiner

*Primary Examiner* — Kwang B Yao
*Assistant Examiner* — Kenan Cehic
(74) *Attorney, Agent, or Firm* — Ross D. Synder & Associates, Inc.

(57) ABSTRACT

In accordance with at least one embodiment, credit-based flow control for high-speed interfaces is provided. Decoupling (separation) of high speed interface reference clocks from the interface data rates is enabled. Such decoupling allows consolidation of reference clocks used for high speed interfaces, thereby enabling one reference clock to be used for multiple interfaces having different data rates. It also results in reduced buffer resource (memory) requirements, and reduced system latency. In redundant systems it also simplifies the direct vs. spare selection mechanism.

5 Claims, 8 Drawing Sheets

| 8's | 4's | 2's | 1's | 1/2's | 1/4's | 1/8's | 1/16's | 1/32's | 1/64's | 1/128's | 1/256's |
|---|---|---|---|---|---|---|---|---|---|---|---|
| 11 | 10 | 9 | 8 | 7 | 6 | 5 | 4 | 3 | 2 | 1 | 0 |
|  |  |  |  | ● |  |  |  |  |  |  |  |

FIG. 3

CREDIT-BASED RATE CONTROL FOR HIGH-SPEED INTERFACES

CROSS-REFERENCE TO RELATED APPLICATIONS

BACKGROUND OF THE INVENTION (1) Field of the Invention

The present application relates generally to communication interfaces and, more particularly, to transmission rate control in digital communication interfaces.

(2) Description of the Related Art

Modern high-speed interfaces (including serial and parallel interfaces), which may be implemented as links, suffer from several common pitfalls. As one example, ensuring proper timing of data communications via interfaces can be complex and difficult. Reference clocks are timing sources upon which the timing of data communications (e.g., transmission, conveyance across a link, reception) are based. Ideally, the number of reference clocks would be minimized to reduce the complexity of and space occupied by the reference clock circuitry. However, interface data rates are tightly tied to interface reference clock frequencies, thus making it difficult to consolidate these reference clock sources and driving high the number of discrete reference clock sources on a device/card, especially when multiple interfaces are provided, as different interfaces of the same device may have different throughput requirements. Very specific data rates drive very specific reference clock frequency requirements which are often difficult to satisfy. The fixed reference clock frequencies also do not allow for any flexibility in the system, such as minor data throughput adjustments, feature additions, etc. In a typical serial interface, the following three reference clocks exist: (1) the transmitter reference clock, (2) the transmit link reference clock, and (3) the receiver reference clock.

Existence of multiple interfaces on a device (e.g., an integrated circuit or circuit card) drives number of reference clocks high. This can result in compromised system reliability and increased system complexity and/or cost.

As another example, the separation of the reference clock frequency from the data rate in a typical system today is handled via the use of some form of a backpressure mechanism. Such mechanisms unfortunately have numerous pitfalls. For example, they introduce large response latency as the receiver has to inform the transmitter to slow down and the transmitter has to react to this request. In the meantime the data path between the transmitter and the receiver might be filled with data which the receiver has to be able to accommodate. Also, the large response latency therefore results in large buffering capacity requirement, and thus large buffer (memory) resource consumption. Furthermore, the large buffer resource results in increased data delay and increased data delay variation (i.e., jitter). Moreover, the backpressure messaging itself consumes the precious data path bandwidth.

Reference clock consolidation for interfaces having similar bit rates has been achieved in the past by relying on backpressure control of the interfaces to maintain their respective appropriate rates. With backpressure control, a receiver feeds back an indication to the transmitter to control the rate at which the transmitter transmits data. However, due to latency in receiving and responding to backpressure control signals at interface transmitters, additional storage buffer capacity at interface receivers is required when this technique is used. If the interface rates are substantially dissimilar, using this technique can become impractical because of the large amount of buffer storage required.

For example, substantial latencies result in lengthy round-trip times ($T_{rtt}$) for a transmitter to receive a backpressure indication pertinent to data it has transmitted. As buffer capacity requirements are a function of the product of the round-trip times and the data rates, market demands for increasing data rates thereby force the use of larger buffer capacities as round-trip times remain fairly constant when flow control is based solely on backpressure.

Thus, a technique is needed that avoids primary reliance on backpressure flow control.

BRIEF DESCRIPTION OF THE SEVERAL VIEWS OF THE DRAWINGS

The present invention may be better understood, and its features made apparent to those skilled in the art by referencing the accompanying drawings.

FIG. 3 is a block diagram illustrating a credit counter register in accordance with at least one embodiment.

The use of the same reference symbols in different drawings indicates similar or identical items.

DETAILED DESCRIPTION OF THE INVENTION

Figure 1:
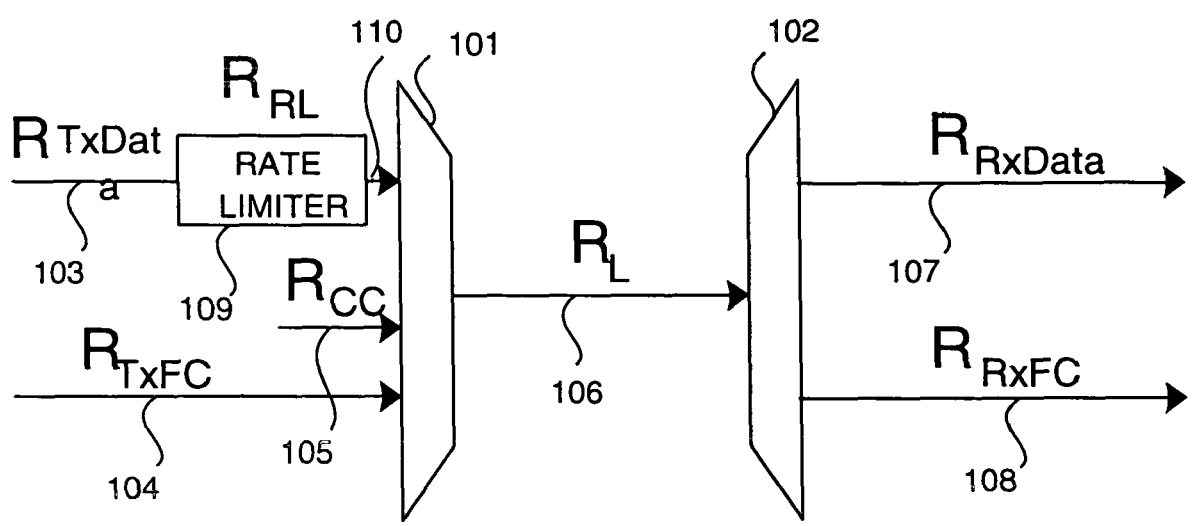
FIG. 1 is a block diagram illustrating a high-speed serial interface system in accordance with at least one embodiment.

In accordance with at least one embodiment, credit-based flow control for high-speed interfaces is provided. Decoupling (separation) of high speed interface reference clocks from the interface data rates is enabled. Such decoupling allows consolidation of reference clocks used for high speed interfaces, thereby enabling one reference clock to be used for multiple interfaces having different data rates. Using the one reference clock for multiple interfaces, if the data rate capacities of the interfaces are insufficient to allow communication at the full rate of the reference clock, rate limiting is provided to reduce the data rates accordingly. Even in absence of multiple interfaces, rate limiting can be applied to a single interface. Decoupling of the reference clocks also results in reduced buffer resource (memory) requirements, and reduced system latency. In redundant systems it also simplifies the direct vs. spare broadcast mechanism.

A free-running credit-based rate limiter limits the transmitter output data rate, while not impeding higher-level flow control and clock compensation/recovery. The data rate limiting is set to match the receiver available input rate. This mechanism does not suffer from the pitfalls of backpressure based rate limiting methods generally used.

Using a typical ON/OFF backpressure mechanism across a high-speed serial interface typically requires large downstream buffers to accommodate fast data rate and the large round-trip delay. These large buffers not only require resources for their implementation, but they also increase the worst-case traffic latency and the worst-case delay variation (i.e., jitter).

This mechanism obviates the need for real-time flow control information to propagate upstream to prevent receiver over-runs. Thus, this mechanism is especially amenable to half-duplex interfaces. In systems which broadcast the traffic to multiple destinations, this mechanism also obviates the complexity and associated reliability issues with having to amalgamate real-time flow control from multiple receivers.

Embodiments may be implemented so as to be applicable to high-speed serial interfaces and/or parallel interfaces, for inter-shelf, inter-device, and/or inter-card communications.

Significant advantages provided over traditional backpressure driven interfaces may be obtained in numerous communication data path as well as control path applications/interfaces (e.g., Aurora, RapidIO, XAUI, PCIX). Since the embodiments need not be tied only to a particular interface standard, embodiments may also be implemented for proprietary interfaces.

High-speed serial interfaces (e.g., serial gigabit interfaces) are useful, for example, in telecommunication equipment, computer systems, as well as data storage systems, and embodiments may be implemented for all such systems. As an example, at least one embodiment may be provided to implement a "hardwired" core/macro for use with serial interface cores/macros of field-programmable gate array (FPGA) devices, such as serial gigabit interface cores or multi-gigabit transceiver serializers/deserializers (serdes).

According to at least one embodiment, the rate of transmission of the data is limited (i.e., rate-limited) to a predetermined rate, rather than react to a backpressure feedback mechanism to control the data rate. The rate limiter value is calculated based on the receiver's available (or desired) input rate (rate at which receiver can receive data). Such a calculation is deterministic. Once the calculation is performed, the resulting value stays static. Once the desired data rate is determined, the rate limiter increment value is calculated. The rate limiter grants transmission privilege to the transmitter based on the accumulation of credits. The credits accumulate in a credit counter on every cycle of the transmit interface reference frequency. The credit accumulation is therefore free-running. Once the credit counter threshold is exceeded, a transmission cycle is executed, and a data word (n-bits of data) is transmitted over the interface. The credit depletion occurs upon transmission of data (thus using up the available bandwidth). When the credit counter's credits subside below the set threshold, data transmission is suspended.

Since the rate limiting is applied only to data, and not to other traffic, such as clock compensation insertion, or other flow control messaging, these other mechanisms remain unaffected by the rate limiting (i.e., full interface bandwidth is available to these other mechanisms). Moreover, the rate limiter can be adjusted to take into account externalities (e.g., downstream externalities). For example, if headers of a finite size need to be added at a point downstream of the transmitter for a given amount of data, the rate at which the rate limiter is set to limit the flow of data may be reduced to accommodate the headers and compensate for the bandwidth the headers consume. As an example, rate limiting can be controlled on a per-packet basis. Accordingly, the rate limiter can be configured to accommodate details of protocols, for example, protocols that involve periodic transmission of a defined set of bits (e.g., a byte).

The rate limiter decouples the transmitted data rate from its internal reference clock and from the link reference clock. For devices or blocks which have multiple transmit interfaces, link data rates may be individually fine-tuned for each interface without having to adjust the actual clocks of the transmitting device. Furthermore, multiple interfaces may share the same clock reference even though the maximum allowable data rate on each may be different. By making the rate limiter configurable from software, receiver bandwidth may be changed over time without the need to change the link clock rates. This is especially useful for backplane applications in which the transmitter may have to be able send data to any of a number of different receivers. (For example, consider the case where a transmitter and interface between two cards supports 10 Gbps but the first generation of the receiving card only supports 5 Gbps. A 10 Gbps receiving card may be designed at a later date, and only the rate limiter configuration needs to change on the transmitting card.)

Rate limiting can be provided by granting transmission credits to the interface at a rate that is a fraction of a reference clock frequency. These credits are accumulated in a credit counter and when the count exceeds a threshold, a transmission cycle is executed to transmit data over the interface. After each transmission cycle the credit count is decremented by the number of credits which represent the amount of data transmitted. On average, the desired interface transmission rate is achieved within a given tolerance, which depends on the granularity of the fractional rate of credit accumulation. For example, if the credit accumulation is based on an 8-bit counter with a credit accumulation rate of 255/256 of the reference clock rate, the granularity is 1/256 of the reference clock rate which results in a tolerance of approximately +/−0.4%. For some applications, the rate of credit accumulation can be adjusted dynamically by adjusting the credit increment. Thus, the desired interface transmission rate can be achieved with a closer tolerance.

FIG. 1 is a block diagram illustrating a high-speed serial interface system in accordance with at least one embodiment. The system comprises a rate limiter 109, a transmitter 101, and a receiver 102. A transmit data signal is provided over a transmit data interface 103 to rate limiter 109 at an effective transmit data rate $R_{TxData}$. Accordingly, a transmit data rate clock signal is encoded into the transmit data signal. A rate-limited transmit data signal is provided over a rate-limited transmit data interface 110 to transmitter 101. Optionally, a clock compensation signal having an effective clock compensation rate $R_{CC}$ is provided over a clock compensation interface 105 to transmitter 101. Optionally, a transmit flow control signal is provided over a transmit flow control interface 104 to transmitter 101 at an effective transmit flow control rate $R_{TxFC}$. By introducing rate limiting at transmitter 101, constraints affecting data rates of the transmitter 101, the communication interface 106, and/or circuitry downstream of communication interface 106, such as receiver 102, can be accommodated, as the limited rate can propagate downstream from the rate limiter.

A communication interface signal is transmitted over a communication interface 106 (e.g., link) from transmitter 101 to receiver 102 at an effective link rate $R_L$ constrained by the capacity of the communication interface 106. Receiver 102 provides a receive data signal over a receive data interface 107 at an effective receive data rate $R_{RxData}$. Optionally, receiver 102 provides a receive flow control signal over a receive flow control interface 108 at an effective receive flow control rate $R_{RxFC}$. The receive flow control signal may be used to obtain a transmit flow control signal, which may be used to provide backpressure flow control for traffic of the other direction in a full-duplex interface.

At least one embodiment may be implemented in a high-speed interface environment where data is serialized (e.g., wherein bits of the data are presented in a sequential manner) and transferred as a data stream across a single (or, when channel bonded, multiple) serial link(s). A clock is encoded into the data stream. A protocol is defined to detect higher-order framing boundaries within the bit stream (e.g., byte boundaries, segment boundaries, packet boundaries, etc.) Such a protocol introduces an additional overhead, forcing the serial interface to require more bandwidth than the raw data rates (e.g., the data without the additional information provided according to the protocol).

The clock compensation interface 105 allows for clock compensation sequences insertion. If a clock compensation interface 105 is utilized, bandwidth for implementing it is consumed by receiver 102.

The effective rates and their mathematical relationships may be expressed as described below. Differences in protocols at each point possibly produce differences in overhead at the defined reference points.

The following definitions apply:

$R_{TxData}$ ... effective Tx data rate,
$R_{RxData}$ ... effective Rx data capacity rate,
$R_{RL}$ ... effective Rate Limit rate,
$R_L$ ... Link pure data rate (aggregate of all rates but without protocol overhead),
$R_{CC}$ ... Clock Compensation rate, and
$R_{TxFC}$ ... Flow Control messaging rate.

In a serial interface system the following expressions apply:

$$R_L \geq R_{TxData} + R_{CC} + R_{TxFC} \quad \quad \quad 1)$$

This ensures that the communication interface 106 has the capacity to convey all of the information presented to it by the transmitter 101.

$$R_{RxData} \geq R_{TxData} \quad \quad \quad 2)$$

$$R_{RxFC} \geq R_{TxFC} \quad \quad \quad 3)$$

These ensure that the receiver 102 can has the capacity to receive all of the information transmitted to it by the transmitter 101. Typically, the communication interface rate (i.e., link rate $R_L$) is a function of the link's reference clock, and the raw data rate on interface 239 is a function of the transmitter's reference clock, while $R_{RxData}$ and $R_{RxFC}$ are functions of the receiver's reference clock.

The constraints imposed according to the foregoing relationships exist at each interface of a device. Consider the simple case of a full-duplex interface in which the transmitter and receiver both use the same protocol. According to the second expression above, a device's transmitter and receiver can share the same clock if $R_{RxData} = R_{TxData}$. This implies that both devices share the same reference clock, but in many cases that is not practical. Furthermore, if a device has multiple unrelated interfaces, these constraints may impose limits of very specific frequency ranges for each interface, which is often not viable for practical design, and has a negative impact on the system cost and reliability.

In a practical design it is therefore desirable to have the serial link reference clock, the parallel transmit interface reference clock and the parallel receive interface reference clock decoupled (e.g., having a loose relationship) from each other as much as possible.

A solution may be found in rate limiting the transmit user data stream, and a credit-based rate limiter may be used to implement such a solution. The credit-based rate limiter throttles the transmit data directly and takes into account the natural throttling that occurs when clock compensation sequences are inserted or flow control messages are inserted. The credit-based rate limiter also doesn't suffer from the redundancy selection and latency pitfalls which plague link-level backpressure schemes.

The data path rate limiting guarantees that the rate of the transmit data is lower or equal to the capacity of the receive input data rate. Since both the transmitter and receiver can operate from separate reference clocks, this mechanism ensures that the transmitter does not output data at a rate higher than what the receiver can accommodate. This mechanism decouples the transmitter and receiver system reference clocks. It also decouples the link rate from the transmitter and receiver system data rates and eliminates the requirement for link level backpressure on the interface.

The transmit data input rate is limited to a predetermined rate. The predetermined rate is calculated based on the receive data available input rate (i.e., the rate at which the receiver can accept data).

Note that in many applications the rate of flow control traffic is inherently rate limited. If this is not the case, it is also possible to use this technique to rate limit the flow control traffic.

Figure 2:
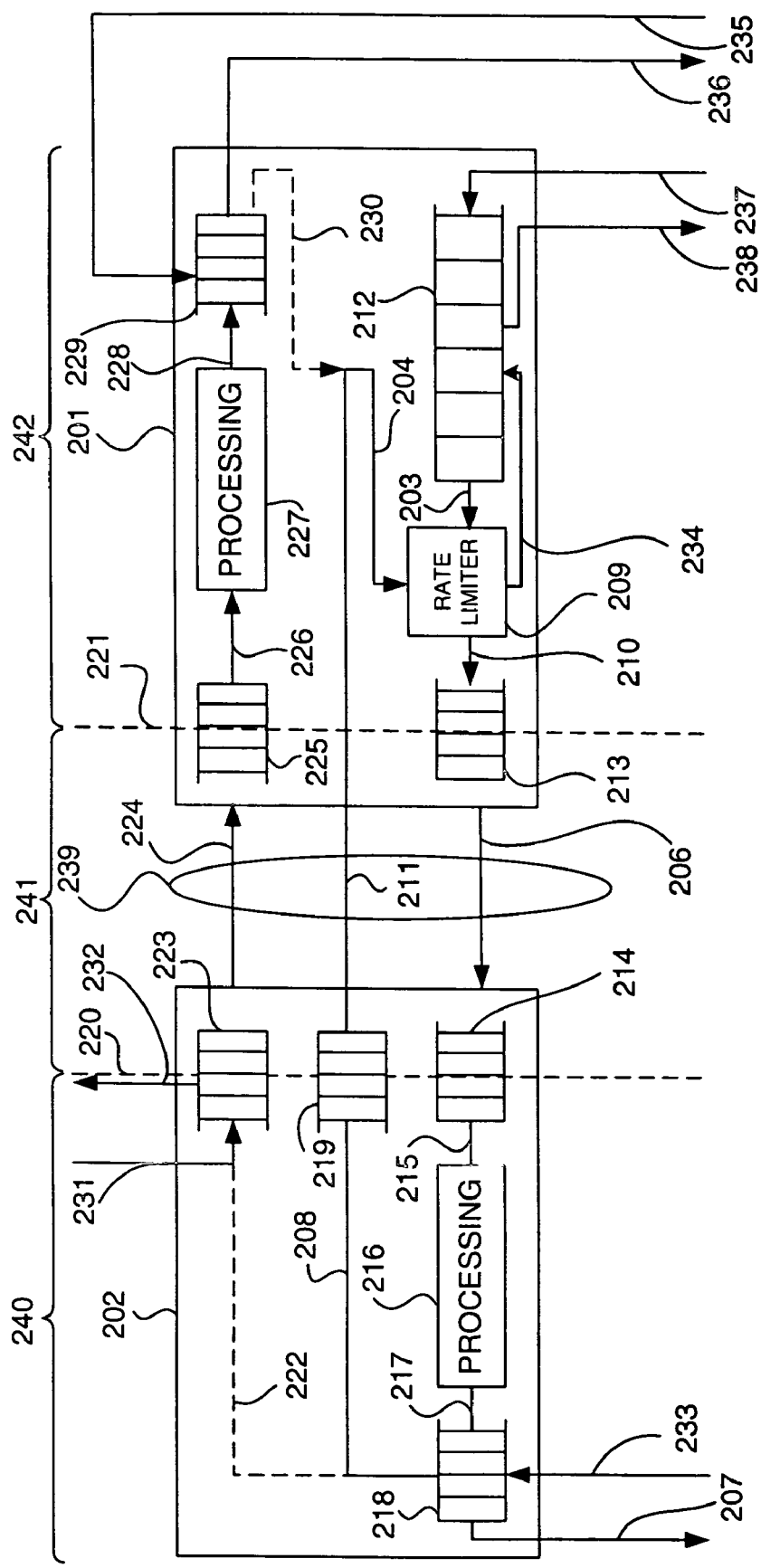
FIG. 2 is a block diagram illustrating a system in accordance with at least one embodiment.

FIG. 2 is a block diagram illustrating a system in accordance with at least one embodiment. The system comprises a first communication module 201, a second communication module 202, and an interface 239 coupling the first communication module 201 to the second communication module 202.

First communication module 201 comprises transmit data input queue 212, rate limiter 209, transmit data output queue 213, receive data input queue 225, processing block 227, and receive data output queue 229. Transmit data input queue 212 receives transmit data via input 237, which is coupled to transmit data input queue 212. Transmit data input queue 212 preferably provides a backpressure flow control signal via output 238. As illustrated, input 237 can be received from and output 238 can be provided to circuitry external to first communication module 201. Transmit data input queue 212 is coupled to rate limiter 209 via transmit data interface 203 and provides transmit data to rate limiter 209. Rate limiter 209 is coupled to transmit data output queue 213 via rate-limited transmit data interface 210 and rate-limited transmit data is passed to transmit data output queue 213 via rate-limited transmit data interface 210.

Second communication module 202 comprises receive data input queue 214, processing block 216, receive data output queue 218, transmit data output queue 223, and flow control output queue 219. Rate-limited transmit data is transmitted to receive data input queue 214 of second communication module 202 from transmit data output queue 213 via link 206 of communication interface 239, as link 206 couples transmit data output queue 213 to receive data input queue 214. Receive data input queue 214 passes receive data to processing block 216 via receive data input 215, which couples receive data input queue 214 to processing block 216. Processing block 216 provides processed receive data to receive data output queue 218, which is coupled to processing block 216 via processed receive data output 217. Receive data output queue 218 provides receive data at receive data interface 207, which is coupled to receive data output queue 218. Receive data from receive data interface 207 may be output from second communication module 202, to destinations beyond second communication module 202. Receive data output queue 218 may receive a backpressure flow control signal, for example, via input 233, to control the rate at which receive data is provided over receive data interface 207.

Receive data output queue 218 may also provide queue depth information for receive data output queue 218 to flow control output queue 219, which is coupled to receive data output queue 218 via receive flow control interface 208, and/or to transmit data output queue 223, which is coupled to receive data output queue 218 via transmit output interface 222. Receive flow control output queue 219 is coupled to flow control link 211 of communication interface 239 and provides flow control information to transmit flow control interface 204 via flow control link 211. Transmit flow control interface 204 is coupled to rate limiter 209 and can provide flow control information to rate limiter 209 for use in controlling the flow of data over link 206 of communication interface 239. Flow control link 234 is provided from rate limiter 209 to transmit data input queue 212 to control the flow of data to rate limiter 209.

Optionally, queue depth information for receive data output queue 218 may be provided by receive data output queue 218 to transmit data output queue 223 via transmit output interface 222, and transmit data output queue 223 may transmit data over link 224 of communication interface 239 to receive data input queue 225, which is coupled to transmit data output queue 223 via link 224. Receive data input queue 225 can pass receive data to processing block 227 via receive data input 226 which couples receive data input queue 225 to processing block 227. Processing block 227 can pass processed receive data to receive data output queue 229 via processed receive data output 228, which couples processing block 227 to receive data output queue 229. Optionally, receive data output queue 229 can pass receive data and/or information received along with receive data to transmit data input queue 212 via receive data output 230, which optionally couples receive data output queue 229 to transmit data input queue 212. As another option, receive data output queue 229 can provide receive data to circuitry external to first communication module 201, for example, via output 236 and/or can receive a backpressure flow control signal from circuitry external to first communication module 201, for example, via input 235. As another option, transmit data output queue 223 may receive data from a source external to second communication module 202, for example, via input 231, and/or may provide a backpressure flow control signal to circuitry external to second communication module 202, for example, via output 232.

Receive data input queue 214, flow control output queue 219, and transmit data output queue 223 buffer communications across clock domain boundary 220, which provides demarcation between a receiver clock domain 240 and an interface clock domain 241. Transmit data output queue 213 and receive data input queue 225 buffer communications across clock domain boundary 221, which provides demarcation between the interface clock domain 241 and a transmitter clock domain 242.

FIG. 3 is a block diagram illustrating a credit counter register in accordance with at least one embodiment. A credit-based rate limiter may be implemented using a credit counter preferably comprising a credit counter register. Credit counter register 313 comprises a binary register comprising a first plurality of bits, wherein the first plurality of bits comprises a second plurality of bits representing an integral portion of a binary value and a third plurality of bits representing a fractional portion of the binary value. Therefore, together, the second plurality of bits and the third plurality of bits represent a binary value having both an integral portion and a fractional portion. As an example, credit counter register 313 is depicted as a twelve-bit binary counter comprising bits numbered zero through 11 in increasing place value. In accordance with such an example, the zeroeth bit, bit 301, has a place value of $1/256$. The first bit, bit 302, has a place value of $1/128$. The second bit, bit 303, has a place value of $1/64$. The third bit, bit 304, has a place value of $1/32$. The fourth bit, bit 305, has a place value of $1/16$. The fifth bit, bit 306, has a place value of $1/8$. The sixth bit, bit 307, has a place value of $1/4$. The seventh bit, bit 308, has a place value of $1/2$. The eighth bit, bit 309, has a place value of 1. The ninth bit, bit 310, has a place value of 2. The tenth bit, bit 311, has a place value of 4. The eleventh bit, bit 312, has a place value of 8.

While a twelve-bit binary counter having four bits representing an integral portion of a value and eight bits representing a fractional portion of a value is depicted in this example, it should be understood that credit counter register 313 may be implemented with a counter having a different number of bits and/or a different number of bits representing an integral portion of the value and/or a different number of bits representing an fractional portion of the value. Also, while a decimal point 314 is illustrated to denote the demarcation of the integral portion from the fractional portion, it should be understood that the value and/or its fractional portion and/or its decimal portion need not be considered to be of base ten (i.e., decimal), but may be considered to be of another base, such as base two (i.e., binary), base eight (i.e., octal), base sixteen (i.e., hexadecimal), or some other base.

Figure 4:
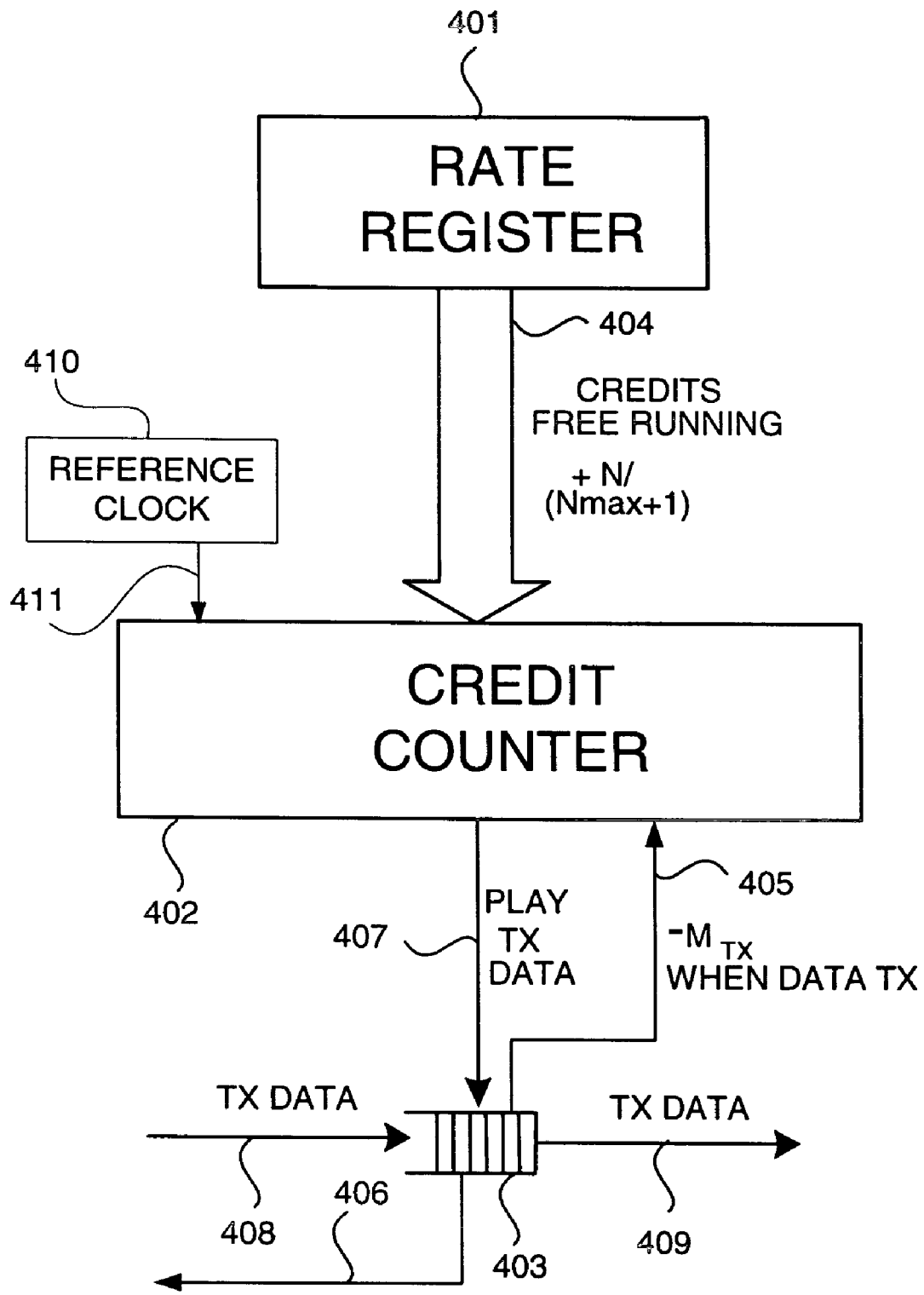
FIG. 4 is a block diagram illustrating a rate limiter in accordance with at least one embodiment.

FIG. 4 is a block diagram illustrating a rate limiter in accordance with at least one embodiment. The rate limiter comprises a rate register 401, a credit counter 402, and a rate limiter queue 403. Rate register 401 is coupled to credit counter 402 via rate register output 404. According to the value in rate register 401, credit counter 402 is incremented on every reference clock cycle by a programmable credit value $N/(N_{max}+1)$. The credit counter is decremented by $M_{TX}$ when a unit of data is read out of the transmit buffer, as illustrated by decrementing input 405 received at credit counter 402 from rate limiter queue 403. N is a configurable value. $N_{max}$ is the maximum credit increment value (e.g., 255 for the above example using 8-bits in the credit counter below the "decimal" point, yielding a granularity of $1/256$, i.e. ~0.4%). $M_{TX}$ is the number of credits by which the credit counter is decremented. Its value represents the amount of data transmitted from the transmit buffer. Credit counter 402 receives a reference clock signal from reference clock 410 via reference clock input 411. Accordingly, the reference clock signal is effectively scaled by $N/(N_{max}+1)$ based on the value in rate register 401.

In accordance with the expressions set forth above, the rates of the various traffic components are aggregated over an interface, for example, a typical serial high-speed (e.g., gigabit) interface. The following expressions pertain to such serial link rate aggregation:

$$R_{TxData} \leq R_{RL} \leq R_{RxData}$$

$$R_{RL} = N/(N_{max}+1)*R_{refclk} R_{RL} \leq R_L - R_{CC} - R_{TxFC}$$

The rate limiter allows the data words to be read out of the rate limiter queue only when the value in the credit counter is greater than a pre-determine threshold. (This threshold setting must account for implementation latencies which might otherwise cause the counter to underflow.) An indication from credit counter 402 to rate limiter queue 403 as to whether data may or may not be read out is provided via credit counter output 407. Rate limiter queue 403 receives data via rate limiter input 408 and provides data via rate limiter output 409 when indicated by the indication received via credit counter output 407. Rate limiter queue 403 preferably provides a backpressure flow control signal 406 to control the flow of data being received via rate limiter input 408.

The whole number portion of the counter is chosen to accommodate accumulation of credits when the transmit data is being back throttled by the clock compensation sequences or by flow control messages. The rate limiter may also be disabled to allow the transmitter to send data at its maximum rate.

As an example of one possible implementation, if the transmit rate needs to be back throttled by 0.4%, the credit counter will be incremented by 255/256 on every clock cycle, and decremented by $M_{TX}=1$ whenever a single word is read out of the rate limiter queue. The rate limiter allows words to be read from the rate limiter queue when the credit counter is $\geq 2$.

Figure 5:
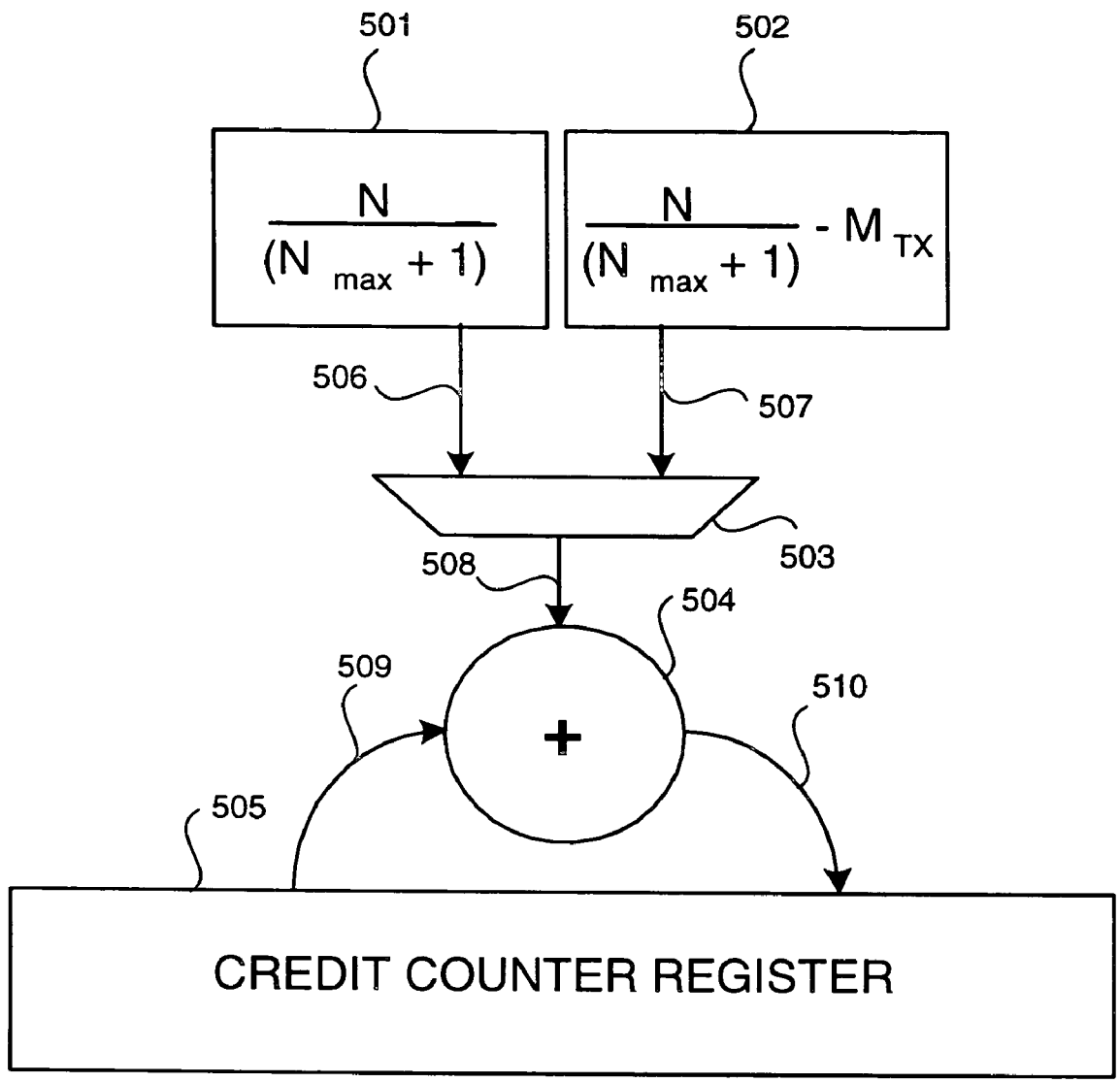
FIG. 5 is a block diagram illustrating a credit counter in accordance with at least one embodiment.

FIG. 5 is a block diagram illustrating a credit counter in accordance with at least one embodiment. The credit counter may be implemented to increment and, if applicable, decrement in one clock cycle. The credit counter comprises increment value register 501, increment and decrement value register 502, multiplexer 503, adder 504, and credit counter register 505. When data is not transmitted, it is desirable to increment credit counter register 505 by the value stored in increment value register 501, which is preferably $N/(N_{max}+1)$. When data is transmitted, it is desirable to both increment credit counter register 505 by that value and decrement credit counter register 505 by the amount $M_{TX}$ of data transmitted (e.g., if one word of data is transmitted, decrement credit counter register 505 by one). The net adjustment (i.e., difference) of that increment and that decrement (e.g., $(N/(N_{max}+1))-M_{TX}$) is stored in increment/decrement value register 502. Increment value register 501 provides increment value register output 506 to a first multiplexer input of multiplexer 503. Increment/decrement value register 502 provides increment/decrement value register output 507 to a second multiplexer input of multiplexer 503. Based on whether or not data is transmitted, multiplexer 503 selects among multiplexer inputs to determine a multiplexer output 508. If no data is transmitted (e.g., during or shortly before a current clock cycle), multiplexer 503 selects increment value register output 506. If data is transmitted (e.g., during or shortly before the current clock cycle), multiplexer 503 selects increment/decrement value register output 507. Multiplexer 503 provides multiplexer output 508 to as an addend to adder 504. Credit counter register 505 provides its contents as an addend to adder 504 via adder input 509. Adder 504 adds the addends to provide a sum at adder output 510, which is provided to credit counter register 505. Credit counter register 505 modifies its contents based on the sum received via adder output 510. Accordingly, credit counter register 505 is incremented and/or decremented by the appropriate values (e.g., for each clock cycle).

In accordance with such an implementation of a credit-based rate limiter, the receiver is capable of accepting a burst of 16 words (i.e., the four binary digits to the left of the "decimal" point). The transmitter buffer must simply be able to accommodate the volume of data associated with its back-pressure loop (dependent on the actual rate limiting and incoming data rate).

At least one embodiment provides for rate limiter delta rate negotiation. The rate limiting complies with $R_{TxData} \leq R_{RL} \leq R_{RxData}$, but $R_{RL}$ is practically implemented as a step function (based on binary counter adjustable in steps). The step resolution delta (in the above example, 1/256, i.e., 0.4%) will cause some receiver bandwidth to be wasted. To compensate for this, a feedback mechanism may be employed which allocates this bandwidth back to the rate limiter based on the status of the receive data queue. This mechanism tells the rate limiter to run at either a "slower" or a "faster" rate. When the receive data queue contains an amount of data less than a predetermined threshold (i.e., is filled to less then the predetermined threshold) a message is sent across the opposite direction serial link telling the rate limiter to run at the "faster" rate. When the receive data queue contains an amount of data more than the predetermined threshold (i.e., is filled to more than the predetermined threshold), a message is sent across the opposite direction serial link telling the rate limiter to run at "slower" rate. Since this feedback loop mechanism requires very minimal bandwidth for the feedback messaging, the messages can be send infrequently (since the messages signal only a small delta in the rate adjustment.

Figure 6:
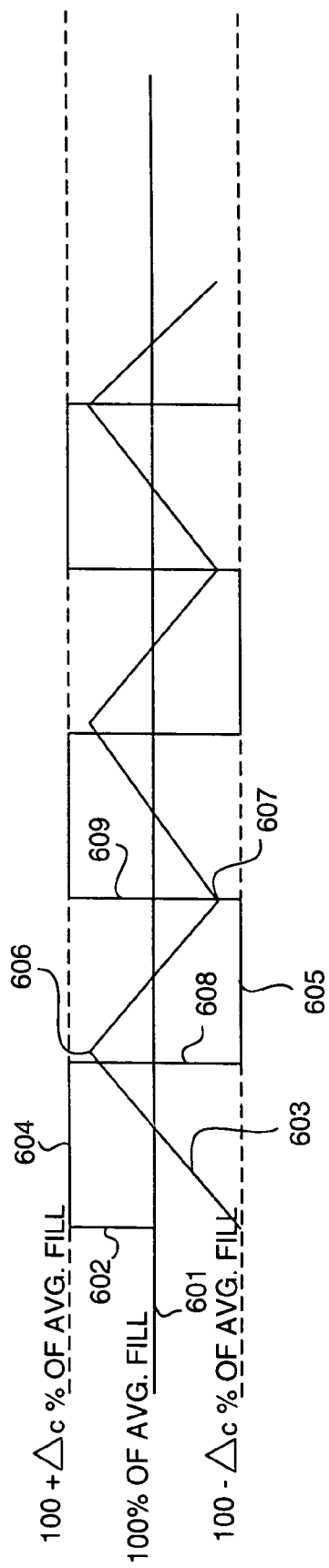
FIG. 6 is a timing diagram illustrating a relationship between clock rate and buffer fill in accordance with at least one embodiment.

FIG. 6 is a timing diagram illustrating a relationship between transmit data rate and receive data output queue fill level in accordance with at least one embodiment. A baseline 601 represents, for receive data output queue fill level 603, the average buffer fill level, and, for data rate 602, an ideal sustainable data rate that would allow data to be transmitted at the maximum rate at which data may be transmitted over the communication interface. As the rate limiter may not be able to utilize a steady-state rate that precisely provides the ideal sustainable data rate, owing to the quantization error due to the finite resolution of the rate register, the elasticity of the receive data output queue can be used to absorb small bursts from the rate limiter to ensure that the output data rate can operate at or very near to the ideal sustainable data rate.

For example, if the buffer fill 603 is below baseline 601 (i.e., less than the average fill level), the value in the rate register (and, consequently, the rate limiter data rate 602, can be increased to a level 604 such that the data rate at which the rate limiter transmits data is slightly higher than the ideal sustainable data rate. Accordingly, the buffer fill 603 will rise. As the buffer fill 603 rises to a maximum 606, which may be greater than the average fill level provided the rate limiter queue can accommodate such increase, the rate limiter data rate 602 can be decreased at time 608 to a level 605 such that the data rate at which the rate limiter transmits data is slightly lower than the ideal sustainable clock rate. Accordingly, the buffer fill 603 will fall. As the buffer fill 603 reaches a minimum 607, which should be less than the average fill level, the rate limiter data rate 602 can be increased at time 609 to again cause the buffer fill 603 to increase. As illustrated, this process may be continued indefinitely, thereby maintaining buffer fill 603, on average, at the average fill level, thereby maximizing utilization efficiency of the communication interface.

In accordance with at least one embodiment, data-dependent credit accumulation may be implemented by decrementing the credit counter by a data-dependent value $M_{TX}$, as opposed to always decrementing the counter by a fixed value. This is useful when the transmitter's protocol differs from that of the receiver. For example, if the receiver's data path employs two additional bytes of overhead per packet, then the transmitter's rate limiter may account for this by decrementing the credit counter by two-bytes-worth of credits at the beginning of every packet.

Figure 7:
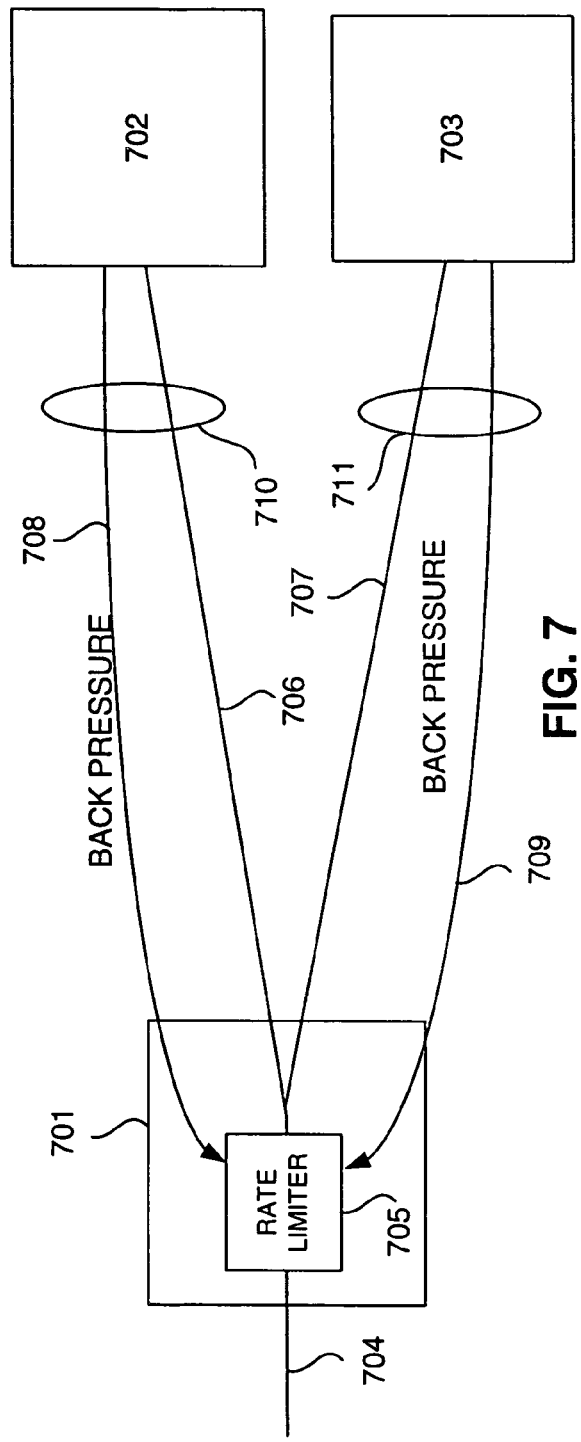
FIG. 7 is a block diagram illustrating system comprising a transmitter and multiple receivers in accordance with at least one embodiment.

FIG. 7 is a block diagram illustrating a system comprising a transmitter and multiple receivers in accordance with at least one embodiment. Such a system is useful, for example, in redundant system architectures. For example, a system may broadcast its data from transmitter 701 to both receivers 702 & 703 and normally rely on accurate reception of data from transmitter 701 at receiver 702, but, in the event of failure of such accurate reception of data at receiver 702 or failure of receiver 702 or some element downstream from receiver 702, the system may switch to relying on accurate reception of data from transmitter 701 at receiver 703.

The use of backpressure flow control in a redundant system architecture can increase complication and even introduce additional potential failure modes. For example, if a transmitter is responsive to backpressure flow control, a faulty backpressure indication from one of two or more redundant receivers may indicate that the transmitter should greatly slow (even to the point of completely stopping) transmission, and, if transmission to both of the redundant receivers is impaired, the purpose of providing the redundant receivers for greater system reliability can be undermined. In essence, primary reliance on backpressure flow control can cause a point of failure to be moved backward through the system to a point before where redundancy is provided. However, by implementing a rate limiter in accordance with at least one embodiment, the primary (and, optionally, only) flow control technique will remain unaffected by downstream faults. The rate limiter can be configured to respond to backpressure flow control until the data rate reaches a reasonable lower limit at which any properly functioning receiver could receive the data. Thus, even if some backpressure flow control is provided secondarily to incrementally adjust data rates, a downstream fault could, at most, result only in a correspondingly slight incremental change in data rate, which could be easily tolerated with minimal effect on system performance.

The system comprises transmitter 701 and receivers 702 and 703. Transmitter 701 comprises rate limiter 705. Transmitter 701 obtains data to be transmitted at transmitter input 704, and those data are rate-limited at rate limiter 705. Transmitter 701 transmits rate-limited data to receiver 702 via link 706 of communication interface 710. Transmitter 701 transmits rate-limited data to receiver 703 via link 707 communication interface 711. Receiver 702 optionally provides a backpressure indication to transmitter 701 via link 708 of communication interface 710. Receiver 703 optionally provides a backpressure indication to transmitter 701 via link 709 of communication interface 711. Rate limiter 705 adjusts a transmit data rate of transmitted data based on at least one backpressure indication. For example, rate limiter 705 may adjust the common transmit data rate of data transmitted via both link 706 to receiver 702 and link 708 to receiver 703 based on either or both of the first backpressure indication received from receiver 702 via link 708 and the second backpressure indication received from receiver 703 via link 709.

Figure 8A:
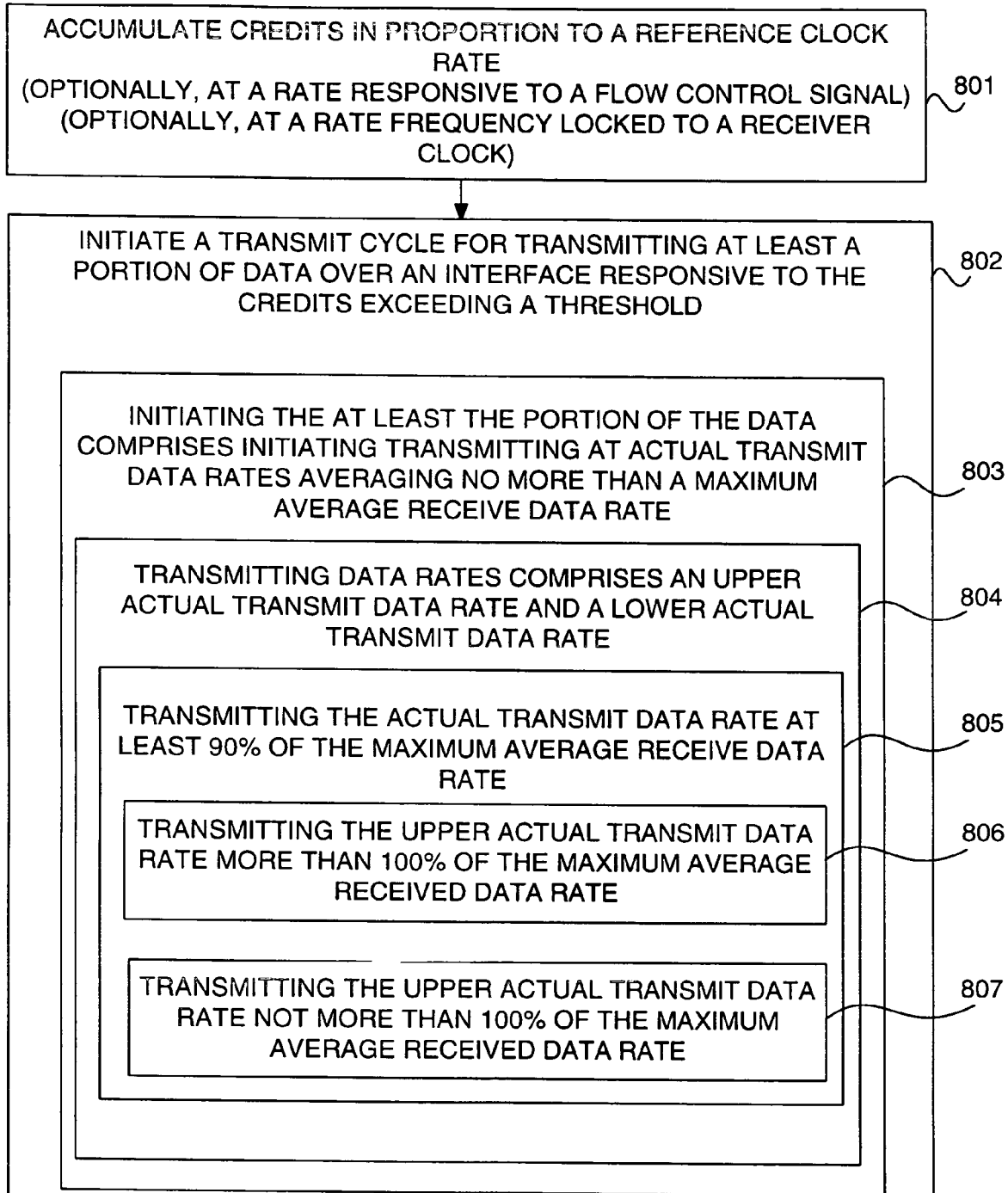
FIG. 8 is a flow chart illustrating a method in accordance with at least one embodiment.
Figure 8B:
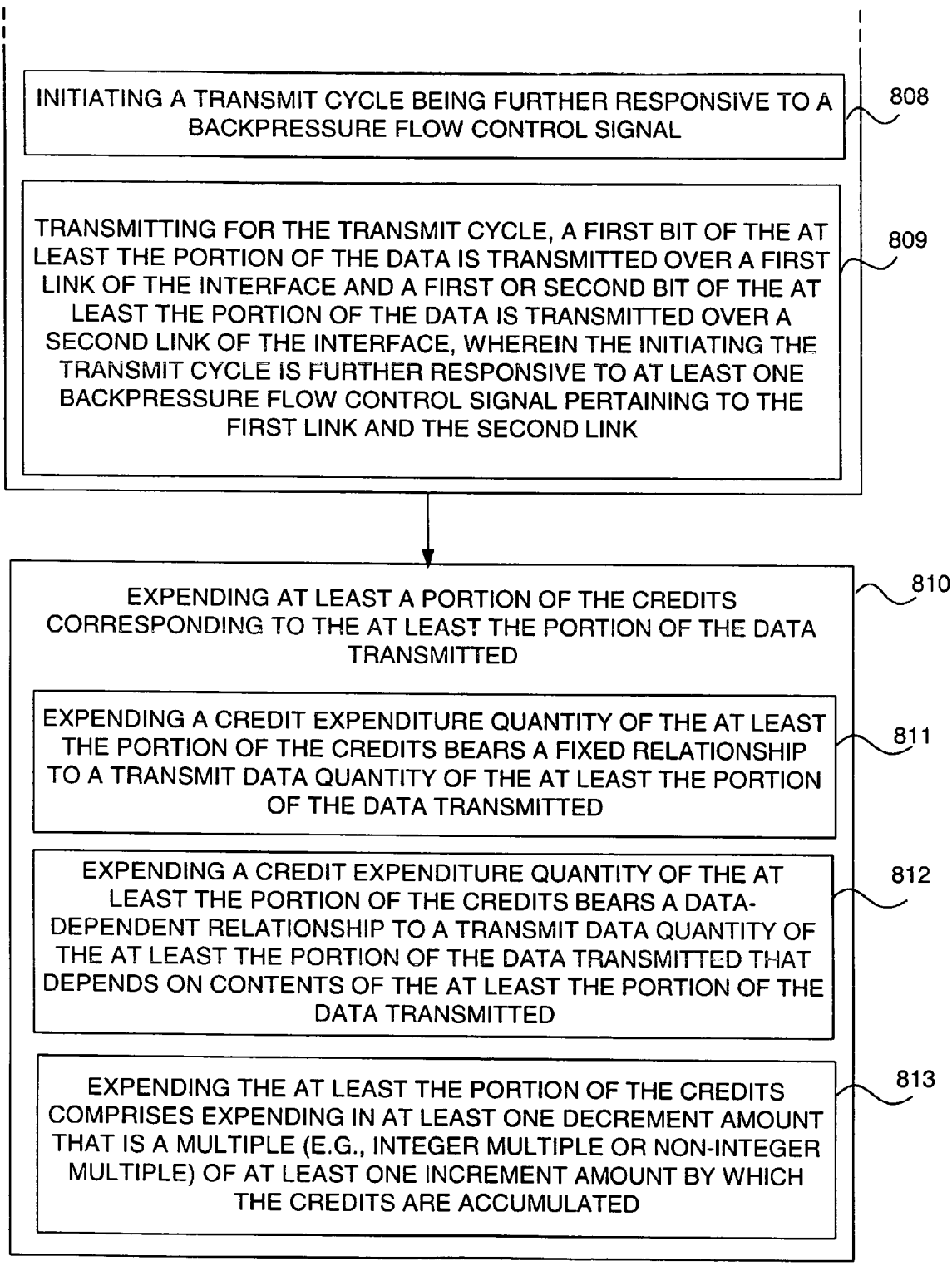

FIG. 8 is a flow diagram illustrating a method in accordance with at least one embodiment. In step 801, credits are accumulated in proportion to a reference clock rate. Optionally, the credits are accumulated at a credit accumulation rate, wherein the credit accumulation rate is adjusted based on a flow control signal, such as a backpressure flow control signal provided by a receiver receiving the data. As another option, the credit accumulation rate is frequency locked to a receiver clock of the receiver. In step 802, a transmit cycle is initiated for transmitting at least a portion of data over an interface responsive to the credits exceeding a threshold. Step 802 may comprise steps 803, 808, and/or 809. In step 803, the at least a portion of the data is transmitted at actual transmit data rates averaging no more than a maximum average receive data rate. Step 803 may comprise step 804. In step 804, the data are transmitted such that actual transmit data rates comprise an upper actual transmit data rate and a lower actual transmit data rate. Step 804 may comprise step 805. In step 805, the data are transmitted such that the lower actual transmit data rate is at least 90% of the maximum average receive data rate. Step 805 may comprise steps 806 and/or 807. In step 806, data are transmitted such that the upper actual transmit data rate is more than 100% of the maximum average receive data rate. In step 807, data are transmitted such that the upper actual transmit data rate is not more than 100% of the maximum average receive data rate.

As noted, step 802 may also comprise steps 808 and/or 809. In step 808, the initiating the transmit cycle is further responsive to a backpressure flow control signal. In step 809, for the transmit cycle, a first bit of the at least the portion of the data is transmitted over a first link of the interface and a first or second bit of the at least the portion of the data is transmitted over a second link of the interface, wherein the initiating the transmit cycle is further responsive to at least one backpressure flow control signal pertaining to the first link and the second link. As one example, the first bit may be transmitted over the first link and the second link in providing the first bit to redundant destinations, such as multiple receivers of a redundant system architecture. As another example, the first bit may be transmitted over the first link and the second bit may be transmitted over the second link in a parallel interface comprising a plurality of links.

From step 802, the method continues to step 810. In step 810, at least a portion of the credits corresponding to the at least the portion of the data transmitted are expended. Step 810 may comprise steps 811, 812, and/or 813. In step 811, credits are expended such that a credit expenditure quantity of the at least the portion of the credits bears a fixed relationship to a transmit data quantity of the at least the portion of the data transmitted. In step 812, credits are expended such that a credit expenditure quantity of the at least the portion of the credits bears a data-dependent relationship to a transmit data quantity of the at least the portion of the data transmitted that depends on contents of the at least the portion of the data transmitted. The data-dependent relationship can account for processing at a receiver or other component downstream from the transmitter, for example, processing that involves changing the amount of data, such as adding or subtracting data from the amount of data being processed, as might occur when a receiver or other component downstream from the transmitter changes a protocol used to communicate the data. In step 813, the at least the portion of the credits are expended in at least one decrement amount that is a multiple of at least one increment amount by which the credits are accumulated. For example, such a multiple may be an integer multiple. As another example, such a multiple may be a non-integer multiple.

Optionally, a transmit rate of a transmitter controlled by a rate limiter may be precisely matched to a clock rate of a receiver by frequency locking the reference clock rate of the reference clock upon which the rate limiter operates to a receiver clock rate of a receiver clock upon which the receiver operates. If the receiver clock is made available for such use, issues of granularity and incremental control of the rate limiting can be avoided. Of course, if the receiver clock is not available for such use, incremental control of the rate limiting can be used to match an average transmit data rate to a maximum average receiver data rate (e.g., as depicted in FIG. 6).

In accordance with at least one embodiment, the need for backpressure flow control is obviated, thereby avoiding the disadvantages associated with backpressure flow control, such as increased data delay, increased data delay variation, buffering resource requirements, "upstream" bandwidth requirements, and reliability implications for redundant applications. In accordance with at least one embodiment, reference clock consolidation between interfaces of a device (i.e. fewer oscillators and fewer clock domains within devices) is enabled, thereby providing benefits such as reduced cost and higher reliability. In accordance with at least one embodiment, reference clock decoupling between devices is facilitated, thereby reducing the need for inter-device reference clock distribution. This is also useful in "open architectures," in which one device must be able to talk to different devices via the same interface or in which a receiver's bandwidth may change as the system evolves.

Flexible functionality readily promotes block reuse between designs. The rate limiter's programmability allows an interface block designed for one device to be used in another device.

One attribute that may be observed with at least one embodiment is that interfaces having substantially dissimilar bit rates are controlled by the same reference clock. Large interface receiver buffers may be used, but, as at least one embodiment obviates the need for large interface receiver buffers, and such buffers typically would be costly, large interface receiver buffers need not be used.

Accordingly, a method and apparatus for credit-based rate control of high-speed interfaces is described. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. Apparatus comprising:
   a transmitter; and
   a rate limiter coupled to the transmitter for limiting an actual transmit data rate at which data are transmitted by the transmitter, wherein the rate limiter constrains transmission of the data in accordance with credits accumulated in proportion to a reference clock rate and expended upon transmission of the data, wherein the rate limiter comprises:
   a rate register for storing at least one value corresponding to an accumulation rate at which the credits are accumulated; and
   a credit counter for maintaining the credits, wherein the at least one value comprises:
   an upper value corresponding to an upper accumulation rate; and
   a lower value corresponding to a lower accumulation rate, wherein the rate limiter operates at the upper accumulation rate for a first period of time and at the lower accumulation rate for a second period time such that, over the first and second periods of time, the rate limiter operates at an average rate adapted to conform to a maximum average receive rate at which the data may be received.

2. The apparatus of claim 1 wherein the rate limiter is adapted to be responsive to a backpressure flow control signal.

3. The apparatus of claim 1 wherein, during a first transmit cycle, the transmitter is adapted to provide a first bit of the data along a first link and a second bit of the data along a second link, wherein the rate limiter is adapted to be responsive to at least one backpressure flow control signal pertaining to the first link and the second link.

4. The apparatus of claim 1 wherein, during a first transmit cycle, the transmitter is adapted to provide a first bit of the data along a first link to a first receiver and along a second link to a second receiver, wherein the rate limiter is adapted to be responsive to at least one backpressure flow control signal pertaining to the first link and the second link.

5. The apparatus of claim 1 wherein the transmitter is adapted to provide a first bit of the data along a first link to a first receiver, wherein the credits are accumulated at a credit accumulation rate that is frequency locked to a receiver clock of the receiver.

* * * * *